United States Patent
Novak et al.

(10) Patent No.: US 11,453,763 B2
(45) Date of Patent: Sep. 27, 2022

(54) RUBBER TERPENE FOOTWEAR

(71) Applicant: The North Face Apparel Corp., Wilmington, DE (US)

(72) Inventors: Kelsey Novak, Dover, NH (US); Emily Fesquet Alati, Portsmouth, NH (US)

(73) Assignee: The North Face Apparel Corp., Wilmington, DE (US)

( * ) Notice: Subject to any disclaimer, the term of this patent is extended or adjusted under 35 U.S.C. 154(b) by 0 days.

(21) Appl. No.: 16/265,716

(22) Filed: Feb. 1, 2019

(65) Prior Publication Data

US 2019/0284369 A1  Sep. 19, 2019

Related U.S. Application Data

(60) Provisional application No. 62/644,312, filed on Mar. 16, 2018.

(51) Int. Cl.

| | | |
|---|---|---|
| *C08L 7/00* | (2006.01) | |
| *C08L 23/28* | (2006.01) | |
| *A43B 13/04* | (2006.01) | |
| *C08L 19/00* | (2006.01) | |
| *C08K 3/06* | (2006.01) | |
| *A43B 1/10* | (2006.01) | |

(52) U.S. Cl.
CPC ............... *C08L 7/00* (2013.01); *A43B 13/04* (2013.01); *C08K 3/06* (2013.01); *C08L 19/00* (2013.01); *C08L 23/28* (2013.01); *A43B 1/10* (2013.01); *C08L 2205/035* (2013.01); *C08L 2205/06* (2013.01)

(58) Field of Classification Search
CPC ............. C08L 7/00; C08L 23/28; A43B 13/04
USPC ......................................................... 524/499
See application file for complete search history.

(56) References Cited

U.S. PATENT DOCUMENTS

| | | | |
|---|---|---|---|
| 2,631,984 A | 3/1953 | Crawford et al. | |
| 4,020,039 A | 4/1977 | Dunn et al. | |
| 4,257,934 A * | 3/1981 | O'Mahoney, Jr. | ........ C08L 9/06 524/271 |
| 4,373,041 A * | 2/1983 | Wood | .................... C08K 5/548 524/270 |
| 5,736,593 A | 4/1998 | Sandstrom | |
| 6,378,582 B1 | 4/2002 | Sandstrom et al. | |
| 7,638,567 B2 | 12/2009 | Lemelin | |
| 8,580,877 B2 | 11/2013 | Tsou et al. | |
| 9,670,341 B2 | 6/2017 | Chen et al. | |
| 2004/0092648 A1 | 5/2004 | Jones et al. | |
| 2007/0270538 A1* | 11/2007 | Somers | ................... C08L 23/22 524/496 |
| 2009/0159170 A1* | 6/2009 | Burkholder | .............. C08K 3/04 152/510 |
| 2010/0160513 A1* | 6/2010 | Sandstrom | ............. C08K 5/098 524/274 |
| 2012/0034486 A1* | 2/2012 | Nakano | .................. B29D 29/06 428/608 |
| 2012/0252929 A1 | 10/2012 | Shaw | |
| 2014/0336311 A1 | 11/2014 | Rapo-Brunet | |
| 2017/0181498 A1 | 6/2017 | Whelan et al. | |

FOREIGN PATENT DOCUMENTS

| | | |
|---|---|---|
| CA | 3036458 A1 | 9/2019 |
| CN | 101910278 A | 12/2010 |
| CN | 103435858 | 12/2013 |
| CN | 103957736 A | 7/2014 |
| CN | 110272595 A | 9/2019 |
| EP | 0583369 | 2/1994 |
| EP | 3546515 A1 | 10/2019 |
| JP | 61-007374 A | 1/1986 |
| JP | 62-137002 A | 6/1987 |
| JP | 2010-159349 A | 7/2010 |
| JP | 2013-515817 A | 5/2013 |
| JP | 2015-506735 A | 3/2015 |
| JP | 2016-189969 A | 11/2016 |
| JP | 2019-166317 A | 10/2019 |
| KR | 10-2002-0057556 | 7/2002 |
| KR | 10-2004-0026060 | 3/2004 |
| KR | 10-2006-0042463 A | 5/2006 |
| KR | 10-0894516 B1 | 4/2009 |
| KR | 10-1156575 B1 | 6/2012 |
| KR | 10-2019-0109301 A | 9/2019 |
| MX | 2019003022 A | 9/2019 |

(Continued)

OTHER PUBLICATIONS

Baruddin, et al., Morphology and mechanical properties of palm based fly ash reinforced dynamically vulcanized natural rubber/polypropylene blends, Procedia Chemistry, Jan. 1, 2012;4:146-153.

Primary Examiner — Deve V Hall
(74) Attorney, Agent, or Firm — Smith, Gambrell & Russell LLP

(57) ABSTRACT

Disclosed is a rubber composition for footwear. The rubber composition may comprise from 3 phr to 90 phr of a first rubber component, from 5 phr to 100 phr of a second rubber component, from 1 phr to 10 phr of a tackifying resin, from 10 phr to 60 phr of a reinforcing filler component, from 1 phr to about 10 phr of a plasticizer component, from 0.1 phr to 5 phr of a curing component. The rubber composition may exhibit a wet coefficient of friction of from 0.4 to 0.65 when tested in accordance with SATRA TM144, a dry coefficient of friction of from 0.76 to 0.90 when tested in accordance with SATRA TM144, and a DIN abrasion of 140 to 300 when tested in accordance with DIN 53616.

14 Claims, 3 Drawing Sheets

(56) References Cited

FOREIGN PATENT DOCUMENTS

| WO | 92/20737 | A2 | 11/1992 |
| WO | 98/58992 | A1 | 12/1998 |
| WO | 2017/014839 | A1 | 1/2017 |
| WO | 2018/079802 | | 5/2018 |

* cited by examiner

Table 3. Physical properties of the rubber composition compared to a conventional composition.

| | Hardness (ShoreA) | SG (g/cc) | DIN Abrasion (mm³ lost) | Stitch Tear (kgf/cm) | Dynamic Coefficient of Friction | | Ross Flex | | Tensile (kg/cm²) | Elongation (%) | Young's Modulus (kg/cm²) | Die C Tear (Kg/cm) | Trouser Tear (Kg/cm) | Resiliency (%) |
|---|---|---|---|---|---|---|---|---|---|---|---|---|---|---|
| | | | | | Dry | Wet | -15C | RT | | | | | | |
| | | | | | | | Typical Formula | | | | | | | |
| CS1 | 63-64 | 1.10 | 648.0 | 32.2 | 0.79 | 0.51 | 0% | 92% | 46.5 | 202 | 20.9 | 18.8 | 6.7 | 22 |
| CS2 | 60-62 | 1.12 | 599.7 | 34.1 | 0.76 | 0.52 | 4% | 273% | 54.5 | 173 | 15.3 | 19.1 | 8.7 | 22 |
| | | | | | | | Disclosed Traction Formula | | | | | | | |
| E1a | 64-67 | 1.16 | 303.7 | 99.0 | 0.85 | 0.60 | 8% | 10% | 127.0 | 512 | 12.8 | 43.2 | 33.1 | 15 |
| E1b | 65-68 | 1.16 | 297.2 | 96.8 | 0.79 | 0.58 | 4% | 6% | 120.7 | 447 | 12.6 | 45.9 | 42.0 | 17 |
| E1c | 64-67 | 1.14 | 299.6 | 52.7 | 0.80 | 0.58 | 4% | 4% | 130.9 | 546 | 12.2 | 35.4 | 30.9 | 13 |
| E1d | 63-65 | 1.14 | 349.2 | 75.8 | 0.85 | 0.59 | 4% | 0% | 123.8 | 494 | 13.0 | 48.7 | 42.9 | 13 |
| E1e | 60-64 | 1.15 | 364.3 | 88.5 | 0.85 | 0.58 | 0% | 0% | 141.0 | 521 | 12.9 | 59.1 | 32.5 | 13 |
| E1f | 62-64 | 1.15 | 305.4 | 74.8 | 0.87 | 0.58 | 4% | 13% | 92.4 | 387 | 11.7 | 37.5 | 33.9 | 14 |

FIG. 1

Table 5. Physical properties for rubber compositions according to polyterpene.

|  | Hardness (ShoreA) | SG (g/cc) | DIN Ab. (mm³ lost) | Dynamic Coefficient of Friction | | Tensile (kg/cm²) | Elong. (%) | Young's Modulus (kg/cm²) | Die C Tear (Kg/cm) | Trouser Tear (Kg/cm) | Resiliency (%) |
| --- | --- | --- | --- | --- | --- | --- | --- | --- | --- | --- | --- |
|  |  |  |  | Dry | Wet |  |  |  |  |  |  |
| CS3 | 65-67 | 1.16 | 139.6 | 0.83 | 0.49 | 233.1 | 583 | 23.5 | 77.6 | 56.2 | 41 |
| E2a | 60-64 | 1.16 | 175.5 | 0.84 | 0.38 | 215.8 | 611 | 21.0 | 89.1 | 46.9 | 36 |
| E2b | 64-67 | 1.16 | 156.6 | 0.88 | 0.40 | 222.4 | 608 | 21.8 | 105.2 | 53.6 | 38 |
| E2c | 661-65 | 1.16 | 162.6 | 0.83 | 0.40 | 205.1 | 587 | 21.7 | 90.6 | 54.0 | 38 |

FIG. 2

Table 6. Physical properties for rubber composition including natural rubber compared to natural rubber and bromobutyl rubber.

|  | Hardness (Shore A) | Specific Gravity (g/cc) | DIN Abrasion (mm³ lost) | Dynamic Coefficient of Friction | | Tensile (kg/cm²) | Elongation (%) | 100% Modulus (Mpa) | 200% Modulus (Mpa) | 300% Modulus (Mpa) | Die C Tear (Kg/cm) | Resiliency (%) |
|  |  |  |  | Dry | Wet |  |  |  |  |  |  |  |
| --- | --- | --- | --- | --- | --- | --- | --- | --- | --- | --- | --- | --- |
|  | ASTM D2240 | ASTM D792 | DIN 53616 | SATRA TM144 | | ASTM D412 | ASTM D412 |  |  |  | ASTM D624 |  |
|  | TM-R-012 | TM-R-033 | TM-R-002 | TM-R-066 | | TM-R-047 | TM-R-047 |  |  |  | TM-R-040 |  |
| CS4 | 58-60 | 1.117 | 288.9 | 0.75 | 0.52 | 182.2 | 679 | 1.45 | 2.74 | 4.51 | 29.0 | 38 |
| E3 | 54-58 | 1.124 | 349.9 | 0.83 | 0.53 | 113.6 | 599 | 1.23 | 2.28 | 3.64 | 22.8 | 37 |

FIG. 3

RUBBER TERPENE FOOTWEAR

FIELD OF THE DISCLOSURE

The present disclosure relates to footwear, and in particular to rubber compositions for footwear outsoles and other components of footwear construction to improve traction and durability performance.

BACKGROUND OF THE DISCLOSURE

Recreational and athletic footwear usually feature a sophisticated combination of elements that provide optimal balance, comfort, stability, durability and traction for a wearer. Generally, a wearer may expect footwear to have a certain resilience and may expect to use certain types of footwear on varying surfaces or ground conditions. For these purposes, traction and durability are important aspects of footwear and can depend directly on the composition of the outsole of an article of footwear. There remains a need in the art for an outsole composition that provides optimal traction and durability while maintaining other desirable aspects of footwear such as comfort, stability, and balance, as well as aesthetic preferences.

These and other shortcomings are addressed by aspects of the present disclosure.

SUMMARY

Aspects of the disclosure relate to a rubber composition for footwear, the composition comprising from about 3 phr to 100 phr of a first rubber component, from about 5 phr to about 100 phr of a second rubber component, from about 1 phr to about 10 phr of a tackifying resin, from about 10 phr to about 60 phr of a reinforcing filler component, from about 1 phr to about 10 phr of a plasticizer component, and from about 0.1 phr to about 15 phr of a curing component. The rubber composition has a wet coefficient of friction of from about 0.4 to about 0.65 when tested in accordance with SATRA TM144, a dry coefficient of friction of from about 0.75 to about 0.90 when tested in accordance with SATRA TM144, a hardness of from about 55 to about 70 when tested in accordance with ASTM D2240, and a DIN abrasion of about 140 to 300 when tested in accordance with DIN53616.

Certain aspects of the disclosure relate to a method for forming the rubber composition.

BRIEF DESCRIPTION OF THE DRAWINGS

The above-mentioned and other features and advantages of this disclosure, and the manner of attaining them, will become apparent and be better understood by reference to the following description of one aspect of the disclosure in conjunction with the accompanying drawings, wherein:

FIG. 1 shows Table 3 presenting the physical properties of the rubber composition compared to a conventional composition.

FIG. 2 shows Table 5 presenting the physical properties for rubber compositions according to polyterpene.

FIG. 3 shows Table 6 presenting the physical properties for rubber compositions according to natural rubber or natural rubber with bromobutyl rubber.

DETAILED DESCRIPTION

The present disclosure may be understood more readily by reference to the following detailed description of the disclosure and the Examples included therein. In various aspects, the present disclosure pertains to a rubber composition for the outsole of an article of footwear. Traction and durability are important performance considerations for footwear, particularly recreational and athletic footwear. Outsole design and composition tend to govern traction and durability performance of such footwear. The disclosed rubber composition imparts good traction and durability and may be useful for forming the outsole of a footwear article.

A rubber composition may comprise a rubber component, a tackifying resin, a reinforcing filler component, and a plasticizer component. In certain aspects, the rubber composition comprises a rubber component having a combination of rubber materials. The rubber composition may exhibit certain physical properties that make the composition suitable for use in an outsole for an article of footwear. While the present disclosure indicates the use of the rubber composition in an outsole for an article of footwear, the rubber composition is not limited to application as a footwear outsole. The rubber composition may be useful in construction of other components of an article of footwear including, but not limited to, a foxing and a midsole. The rubber composition exhibits desirable physical properties with respect to a coefficient of friction, Young's Modulus, hardness, Die C tear strength, and DIN abrasion that may make the rubber composition desirable as an outsole for footwear.

Before the present compounds, compositions, articles, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Rubber Component

According to various aspects of the present disclosure, the rubber composition may comprise a rubber component. The rubber component may refer to a diene rubber elastomer. The diene rubber elastomers that are suitable components of the rubber composition are understood to be those elastomers resulting at least in part from diene monomers. These elastomers may comprise a homopolymer or a copolymer derived from the diene monomers. The diene monomers may describe monomers having two double carbon-carbon bonds, whether the double carbon-carbon bonds are conjugated or non-conjugated.

The diene rubber elastomers may comprise essentially unsaturated diene elastomers and/or saturated diene elastomers. Essentially unsaturated diene elastomers include diene elastomers resulting at least in part from conjugated diene monomers, having a content of member or units of diene origin (conjugated dienes) that is greater than 15 mol. %. Within the category of essentially unsaturated diene elastomers are highly unsaturated diene elastomers. Highly unsaturated diene elastomers may comprise diene elastomers having a content of units of diene origin (conjugated diene) that is greater than 50 mol. %.

Examples of dienes may include, but are not limited to, polybutadienes, polyisoprenes, natural rubber, butadiene copolymers, isoprene copolymers and mixtures thereof. Suitable copolymers include, for example, butadiene-isoprene copolymers, isoprene-styrene copolymers, isoprene-butadiene-styrene copolymers. Examples of diene elastomers, or rubbers, may include, but are not limited to, highly unsaturated diene elastomers such as polybutadienes (BR), polyisoprenes (IR), natural rubber (NR), butadiene copolymers, isoprene copolymers and mixtures of the foregoing elastomers. These copolymers may comprise isoprene/butadiene copolymers (BIR), isoprene/styrene copolymers (SIR) and isoprene/butadiene/styrene copolymers (SBIR).

Essentially saturated diene elastomers are diene elastomers that do not fall within the definition of unsaturated diene elastomers. Essentially saturated diene elastomers may include, but are not limited to butyl rubbers and copolymers of dienes and of alpha-olefins of the ethylene propylene diene monomer (M-class) rubber (EPDM) type rubber. These diene elastomers may be characterized by low or very low content of units of diene origin, also known as conjugated dienes. In some examples, the content of units of diene origin may be less than 15 mol. %.

Examples of conjugated dienes may include 1,3-butadiene, 2-methyl-1,3-butadiene, 2,3-di(C1-C5 alkyl)-1,3-butadienes such as, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Examples of vinyl-aromatic compounds include styrene, ortho-, meta- and para-methylstyrene, the commercial mixture "vinyltoluene", para-tert-butylstyrene, methoxystyrenes, chloro-styrenes, vinylmesitylene, divinylbenzene and vinylnaphthalene.

The copolymers may contain between 99 wt. % and 20 wt. % of diene units and between 1 wt. % and 80 wt. % of vinyl-aromatic units. The elastomers may have any microstructure, which is a function of the polymerization conditions used, in particular of the presence or absence of a modifying and/or randomizing agent and the quantities of modifying and/or randomizing agent used. The elastomers may, for example, be block, random, sequential or micro-sequential elastomers, and may be prepared in dispersion or in solution; they may be coupled and/or starred or alternatively functionalized with a coupling and/or starring or functionalizing agent.

The rubber component may comprise what is described as a synthetic rubber. Representative synthetic rubber polymers are the homopolymerization products of butadiene and its homologues and derivatives, for example, methylbutadiene, dimethylbutadiene and pentadiene, as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as EPDM described above, and in particular, ethylene/propylene/dicyclopentadiene terpolymers. It should be understood that any of the rubbers may be end-modified.

As provided above, the rubber component may comprise an unsaturated diene elastomer such as natural rubber. Natural rubber commonly may be derived from the plant *Hevea brasiliensis*. Natural rubber has also been derived from *Parthenium argentatum* (Gray), commonly known as guayule.

Natural rubber as a rubber component in the disclosed rubber composition may impart the composition certain desirable attributes when compared to other unsaturated diene elastomers. Compared to styrene butadiene rubber, an alternative unsaturated diene elastomer, natural rubber exhibits a greater wear resistance in temperatures below 35° C. (95° F.). As a component of the rubber composition for an outsole, the natural rubber may also be desirable for its physical properties. Natural rubber has a low viscosity above 100° C. allowing for the rubber to be workable or malleable at temperatures exceeding 100° C. In certain aspects, the natural rubber may be premasticated, via peptizers for example, to ensure even greater malleability of the rubber. Natural rubber also exhibits a tack level that may ensue that the rubber composition remains intact or stable for molding prior to any necessary curing process. As a further example, natural rubber may contribute to traction, particularly dry traction. With respect to durability, natural rubber may provide abrasion resistance.

As provided above, the rubber composition may comprise a saturated diene elastomer such as halobutyl rubber. Halobutyl rubbers, also described as halogenated butyl rubbers, may comprise chlorobutyl and bromobutyl rubbers. Halobutyl rubbers are generally synthetic rubbers derived from halogenation of a butyl rubber. Both bromobutyl (BIIR) and chlorobutyl (CIIR) have primarily a saturated backbone of isobutylene. Both elastomers have many of the attributes of the butyl polymers, including low gas and moisture permeability, good vibration damping, low glass transition temperature, excellent resistance to ageing and weathering, and wide vulcanization versatility. In a specific example, rubber component comprises may comprise a bromobutyl rubber.

A halobutyl rubber in the disclosed rubber composition may impart the composition certain desirable attributes. As a component of the rubber composition for an outsole, the halobutyl rubber may also be desirable for its physical properties. Halobutyl rubbers have a generally rapid cure rate and may improve co-curability with more unsaturated rubbers including, but not limited to, natural rubber or synthetic rubbers such as nitrile rubber (NBR), styrene-butadiene rubber (SBR), polychloroprene rubber (CR), ethylene-propylene rubber (EPDM), or butadiene rubber (BR). Halobutyl rubbers may also be readily blended with natural rubber or the foregoing synthetic rubbers. Bromobutyl rubber may provide improved wet traction performance as well as energy performance. These attributes may make bromobutyl rubber particularly suitable for use in the outsole of a footwear article.

In effect, selection of a rubber to form the rubber component of the rubber composition may consider the physical nature desired for the rubber composition. For example, it is desirable that the viscosity of the rubber is sufficient to allow easy handling and processing during standard steps in the preparation of a footwear outsole and during vulcanization, or curing, operations. Desirably, the rubber composition has enough uncured strength, also known as green strength, (as evidenced by modulus values) and sufficient viscosity to retain its shape during blending or mixing and has enough strength to substantially retain its shape during the application of the pressure and elevated temperature in a suitable mold during vulcanization.

The rubber composition may comprise the rubber component in a particular amount. For example, the disclosed rubber component may be present in an amount of from about 5 to about 100 phr.

The disclosed rubber component may comprise a combination of diene elastomers or a mixture of several diene elastomers described herein. As an example, the rubber composition may comprise a first rubber component and a second rubber component. The first rubber component and/or the second rubber component may comprise a single diene elastomer or may comprise a combination of diene elastomers having certain characteristics. Attributes of the first rubber component and attributes of the second rubber component may influence performance properties of a footwear outsole formed from disclosed the rubber composition.

In one example, the first rubber component of the rubber composition may comprise a halobutyl rubber as described herein. The halobutyl rubber may comprise bromobutyl rubber. The first rubber component may be present in an amount of from about 3 phr to about 100 phr, or from about 5 phr to about 100 phr, of the rubber composition. More specifically, from about 10 phr to about 100 phr, from about 10 phr to about 90 phr, from about 10 phr to about 80 phr, from about 10 phr to about 70 phr, from about 10 phr to about 60 phr, from about 20 phr to about 90 phr, from about 20 phr to about 80 phr, from about 20 phr to about 70 phr, from about 20 phr to about 60 phr, from about 30 phr to about 90 phr, from about 30 phr to about 80 phr, from about 30 phr to about 70 phr, from about 30 phr to about 60 phr, from about 40 phr to about 90 phr, from about 40 phr to about 70 phr, or from about 40 phr to about 60 phr. The rubber composition may comprise bromobutyl rubber as a first rubber component in an amount from 10 phr to 90 phr.

In a further example, a second rubber component of the rubber composition may comprise an unsaturated diene elastomer. In one example, the second rubber component may comprise a natural rubber. The second rubber component may be present in an amount of from about 10 phr to about 100 phr of the rubber composition. More specifically, from about 10 phr to about 100 phr, from about 10 phr to about 90 phr from about 10 phr to about 80 phr, from about 10 phr to about 70 phr, from about 10 phr to about 60 phr, from about 20 phr to about 90 phr, from about 20 phr to about 80 phr, from about 20 phr to about 70 phr, from about 20 phr to about 60 phr, from about 30 phr to about 90 phr, from about 30 phr to about 80 phr, from about 30 phr to about 70 phr, from about 30 phr to about 60 phr, from about 40 phr to about 90 phr, from about 40 phr to about 70 phr, or from about 40 phr to about 60 phr. The rubber component may comprise natural rubber as a second rubber component in an amount from 10 phr to 90 phr.

The first rubber component may comprise bromobutyl rubber and the second component may comprise natural rubber. In certain examples, the first rubber component may be free of or substantially free of a styrene butadiene rubber. The second rubber component may be free of or substantially free of a styrene butadiene rubber. It is noted however that certain rubbers, such as natural rubber, may include a portion of styrene butadiene rubber as a processing aid. As such, where the rubber composition is free of or substantially free of a styrene butadiene rubber, a styrene butadiene rubber has not been added as a distinct component of the rubber composition.

Tackifying Resin

The rubber composition may comprise a tackifying resin. The tackifying resin may act as a tackifier for natural rubber or non-polar diene elastomers. The tackifying resin may act to hold the rubber composition together in its uncured state until molding and/or curing. The tackifying resin may thus ensure stability and homogeneity of the rubber composition during processing.

The tackifying resin may comprise a terpene resin. That is, the tackifying resin may comprise a terpene polymer, which may be described as a polyterpene. Terpene monomers useful for the terpene homopolymer and copolymer resins include alpha-pinene ($\alpha$-pinene), beta-pinene ($\beta$-pinene), and limonene. Specific examples include but are not limited to polymers of the alpha- and beta-pinene monomers.

In yet further examples, the terpene resin may be a non-polar terpene resin. Non-polar terpene resins may include the polyterpene resins described herein. As an example, the non-polar terpene resin may comprise $\alpha$-pinene.

Commercially available tackifying resins that include terpene resins suitable for use in the present disclosure include, but are not limited to, a $\beta$-pinene derived polymer resin marketed under the name Piccolyte S115™ by Pinova, Del. Piccolyte S115™ is a low molecular weight polyterpene and has a softening point of about 112-118° C. and a glass transition temperature of about 91° C. A second polyterpene resin available from Pinova is Piccolyte S125™, which is a $\beta$-pinene derived polymer resin. Piccolyte™ S125 is a low molecular weight polyterpene resin having a softening point (via ring and ball measurement) of from 122° C. to 128° C. Another commercially available product Piccolyte™ A125 by Pinova. Piccolyte™ A125 is an $\alpha$-pinene derived polyterpene having a molecular weight of about 725 g/mol and a softening point (via ring and ball measurements) of about 122° C. to 128° C.

Natural rubber (cis-polyisoprene) may refer to a naturally occurring, high molecular weight elastomeric polymer. Its molecular configuration is linear, with interior double bonds, and exterior hydrogen atoms. Without wishing to be bound by any particular theory, the placement and position of these double bonds and the hydrogen atoms align well with the corresponding structure of a beta-pinene resin, specifically Piccolyte™ S125. Spatial alignment and intermolecular forces attract the resin and polymer, enhancing their compatibility and affinity for each other.

Without wishing to be bound to any particular theory, Piccolyte™ S125 may reduce the structural entanglement and hardness of the natural rubber polymer, allowing the polymer to flow and become more elastic with minimal disruption to the polymers strength. The flow-ability of the resin/polymer blend enhances traction and adhesion to a wide range of surfaces/substrates. The ability of the resin/polymer blend to flow and come into intimate contact with the running surface creates traction.

The tackifying resin may be present in the rubber composition in a specific amount to provide certain properties. The tackifying resin may be present in an amount from about 1 to about 10 phr. A polyterpene resin, as a tackifying resin, may be present in the rubber composition in an amount of from about 1 phr to about 10 phr, or more specifically from about 2 phr to about 6 phr, or 2 phr to 6 phr, or from about 3 phr to about 10 phr, or from about 3 phr to about 6 phr. In specific examples, the polyterpene resin is present in an amount of about 4 phr. In certain examples, at tackifying resin values above 6 phr, the rubber composition may become too soft and durability may begin to decline.

It is noted that while the disclosed terpene resin is useful as a tackifying resin, the terpene resin may also perform as a plasticizer. As a plasticizer, the terpene resin may lower viscosity of the rubber composition during mixing and help the components of the rubber composition distribute more evenly.

Plasticizer

Particular embodiments of the rubber composition may include at least one plasticizer, such as a plasticizing oil. Generally, the plasticizing oil may soften the rubber composition in both the uncured and cured state. The plasticizing oil may lower viscosity of the rubber composition during mixing. The plasticizer may also facilitate more homogenous mixing and better distribution of components of the rubber composition during formation.

The amount of plasticizing oil useful in any example of the present disclosure may depend upon the particular circumstances and the desired result. In general, for example, the plasticizer may be present in the composition in an amount between about 1 phr and about 20 phr or, between about 1 phr and about 15 phr, or between 1 and 10 phr. As an example, the plasticizer may be present in the rubber composition in an amount between about 1 phr and about 10 phr, such as about 5 phr.

The plasticizer component may comprise a plasticizer oil extracted from petroleum oil, for example, paraffinic, aromatic or naphthenic type. As a specific example, the rubber composition may comprise a plasticizing oil derived from a naphthenic paraffinic oil. Other plasticizer oils include dioctyl adipate (DOA), a monomeric ester plasticizer. Further examples of plasticizer oils may include naturally derived paraffinic oils. These natural paraffinic oils may include, but are not limited to, soybean, coconut, or rapeseed oils.

Reinforcing Filler Component

According to various aspects of the present disclosure, the rubber composition may comprise a reinforcing filler component. Generally, the reinforcing fillers may be added to the rubber compositions to, inter alia, improve wear resistance and tensile strength. A number of inorganic reinforcing fillers may be suitable in the present disclosure. Inorganic reinforcing fillers include any inorganic or mineral fillers. Inorganic reinforcing fillers may take many useful forms including, for example, as powder, microbeads, granules, balls and/or any other suitable form as well as mixtures thereof. Examples of inorganic reinforcing fillers include mineral fillers of the siliceous type, such as silica (silicon dioxide, $SiO_2$), of the aluminous type, such as alumina ($AlO_3$) or combinations thereof. In various examples however, the reinforcing filler may comprise silica, with which a coupling agent is typically associated.

Useful silica reinforcing fillers known in the art include fumed, precipitated and/or highly dispersible silica (known as "HD" silica). Silica reinforcing fillers of the present disclosure may include those fillers that provide desirable performance with respect to grip in the rubber composition. Grip is an important property of the rubber composition as used in construction of footwear components such as the outsole. Certain silica reinforcing fillers may be more appropriate for footwear applications than for other rubber applications. For example, rubber tire industry standards that value both grip and rolling resistance. For footwear applications, however, grip performance may be more relevant or controlling. Examples of useful silica reinforcing fillers that contribute to grip include silica fillers having a higher surface area and smaller particle size. These fillers also provide better wear resistance. One example of a useful silica includes Zeosil™ HRS 1200 MP having a particle diameter of about 15 nm and an average diameter of aggregates of about 40 nm. Other useful silica reinforcing agents offering high surface area and smaller size include, but are not limited to, Zeosil™ 175GR from Solvay, Zeosil™ 175MP from Solvay, Silene™ 732D from PPG, Hi-Sil™ 532EP from PPG, Hi-Sil™ 233 from PPG, Hi-Sil™ 210 from PPG, Hi-Sil™ 243LD from PPG, Hi-Sil™ 233-D from PPG, and Hi-Sil™ 255G from PPG.

The silica reinforcing filler may be present in an amount of from about 10 phr to about 60 phr. In more specific aspects, the silica may be present in an amount of from about 10 phr to about 55 phr, or from about 10 phr to about 50 phr, or from about 10 phr to about 45 phr.

To facilitate coupling of the inorganic reinforcing filler to the diene elastomer, the coupling component may further comprise a coupling agent. The coupling agent may be least bi-functional and may provide a sufficient chemical and/or physical interaction between the inorganic reinforcement filler and the diene elastomer. Examples of coupling agents include organosilanes or polyorganosiloxanes, such as bifunctional organosilanes or polyorganosiloxanes. Such coupling agents and their use are well known in the art. The coupling agent may optionally be grafted beforehand onto the diene elastomer or onto the inorganic reinforcing filler as is known. Or, the coupling agent may be mixed into the rubber composition in its free or non-grafted state. A useful coupling agent is Si69™ (bis[3-(triethoxysilyl)propyl]polysulfide) available from Evonik.

In the rubber compositions according to the present disclosure, the coupling agent may be present in an amount between 1 and 5 phr (for example between 1 and 3 phr). For example, the silane coupling agent may be present in an amount of about 1.5 phr.

In certain aspects, the rubber composition is free, or substantially free of carbon black. Carbon black, which may be a conventional reinforcing filler, is often included in tires to also impart a distinctive black color. The rubber compositions of the present disclosure may exclude carbon black to avoid an outsole formed from the composition that may mark a surface.

Curing Component

The rubber composition of the present invention may comprise in addition to the above components, a curing component or a vulcanization accelerator. According to methods of the present disclosure, a rubber composition may be formed by mixing components described herein under certain conditions to provide an uncured or unvulcanized rubber composition. A curing component may be introduced and the uncured or unvulcanized rubber composition may then be subjected to an appropriate curing or vulcanization process to form the rubber composition in its cured or vulcanized state.

The rubber compositions disclosed herein may thus be cured with a sulfur curing system. That is, the curing component may comprise a sulfur containing agent. In some examples, the rubber composition may be cured with a sulfur curing system that includes free sulfur and may further include, for example, one or more of accelerators, stearic acid and zinc oxide. Suitable free sulfur includes, for example, pulverized sulfur, rubber maker's sulfur, commercial sulfur, and insoluble sulfur. The amount of free sulfur included in the rubber composition is not limited and may range, for example, between 0.5 phr and 10 phr or between 0.5 phr and 5 phr or between 0.5 phr and 3 phr. In further examples, the curing component may include no free sulfur added in the curing system but may instead comprise sulfur donors.

The curing component may comprise a curing or vulcanization accelerators. These accelerators may control the time and/or temperature required for vulcanization and may improve the properties of the cured rubber composition. Examples of accelerators may include sulfur-containing compounds such as sulfenamides. Examples of suitable sulfenamide accelerators include n-cyclohexyl-2-benzothiazole sulfenamide (CBS), N-tert-butyl-2-benzothiazole Sulfenamide (TBBS), N-Oxydiethyl-2-benzthiazolsulfenamid (MBS) and N'-dicyclohexyl-2-benzothiazolesulfenamide (DCBS). Further accelerators may comprise stearic acid and zinc oxide. Another useful accelerator is diisopropyl xanthogen polysulfide (DIXP). If used, DIXP may replace both MBT and MBTS in the rubber composition.

Combinations of accelerators are often useful to improve the properties of the cured rubber composition. As an example, the curing component may comprise one or more of the accelerators dibenzothiazole disulfide (MBTS or DM), 2-mercaptobenzothiazole (MBT or M), and tetrabenzylthiuram disulfide (TBzTD).

Activators are also useful compounds in the curing component. Zinc oxide ZnO and stearic acid, for example, may be present in the rubber composition and are considered to be activators rather than accelerators. Specifically, ZnO helps to improve crosslink efficiency in the rubber and requires the presence of a fatty acid (such as stearic acid) to become soluble in the rubber composition.

Curing agents and accelerators such as MBTS, MBT, TBzTD and sulfur may be polymer bound pre-dispersed (PBPD) pellets. The curing agents and accelerators may have an active chemical concentration greater than 75% to ensure proper curing. In certain examples, the curing agents have an 80% active concentration.

As described herein, certain of the foregoing components facilitate the curing or vulcanization process. Disclosed components of the rubber composition may ensure that the uncured composition has sufficient uncured strength, or modulus, and sufficient viscosity to retain its shape during mixing and building of the composition and enough building tack to and enough strength to substantially retain its shape during the application of elevated pressure and temperature in a suitable mold during vulcanization. For example and as described above, bromobutyl rubber improves curability.

The rubber composition may comprise a further curing aid. For example, the rubber composition may comprise polyethylene glycol (PEG) as a curing aid. In silica filled rubber compositions, polyethylene glycol may provide accelerate curing. PEG may react with hydroxyl groups present in the silica, thereby reducing the number of sites that silica may bond with the curing agent or accelerators. PEG may be present in an amount of from about 1 phr to about 8 phr, or up to about 5 phr. In some examples, PEG is present in an amount of about 4 phr.

Methods

Formation of the rubber composition may comprise a single or several thermo-mechanical working stages, separated for example by one or more intermediate cooling stages. The various components of the composition, including the rubber component, tackifying resin, reinforcing filler, and plasticizing agent may be combined to provide a first mixture. The rubber composition of the present invention can be prepared by a known method, for example, such as by mixing and kneading the components using a rubber kneading device such as an open roll mill or Banbury mixer, and subsequently vulcanizing the mixture.

In one example, the rubber composition may be formed via mixing in multiple stages. The rubber component, such as the first rubber component and second rubber component may be mixed for a period of time at a particular temperature, usually not exceeding 130° C. For example, the natural rubber may be mixed for up to about 10 minutes at a temperature of about 110° C. to about 130° C. A second mixture comprising the plasticizer, tackifying resin, and curing accelerators/aids may be prepared and combined with the coupling agent. The natural rubber may be combined with the reinforcing filler and the resulting mixture may be combined with the second mixture. After mixing for a period of time, the curing agent may be introduced. Inclusion of the curing agents in the first mixture may result in premature cross-linking of the rubber component.

Critical during mixing is stablishing a good dispersion of the various components so that the components may interact as desired within the rubber component matrix. Dispersion of the various components may promote good processing of the composition in the uncured state and, after curing, may ensure a sufficient level of reinforcement.

The rubber may be allowed to rest for a duration of time to assist in the development of certain performance properties. The resting time may vary from 4 hours to about 24 hours.

Particular embodiments of the present invention include the rubber compositions and articles made therefrom in both the "uncured" state and the "cured" state. The uncured state refers to the composition before curing and the cured state refers to the vulcanized state wherein cross-linking or vulcanization has occurred.

Preparation of the disclosed rubber composition may require homogeneity among the respective components. That is, homogeneity of the components forming the rubber composition may affect traction and durability properties of the rubber composition and ultimately a footwear outsole formed therefrom. For example, inconsistent distribution of the reinforcing filler, such as silica, or natural rubber in the composition may result in weakened structural integrity of the rubber composition. The rubber composition may exhibit weak points at the inconsistent points.

The rubber composition may be used to form an outsole for an article of footwear. To form an outsole, the rubber composition may be formed into a sheet of a given thickness. The sheet may be cut into pieces according to weight. The pieces may be placed in heated outsole mold. The outsole mold may be heated for a duration of time. For example, the outsole mold may be heated for up to about ten minutes, or from about five to about ten minutes. The formed outsole may be removed from the mold and allowed to complete cooling to provide the outsole.

Properties

The rubber composition of the present disclosure may exhibit certain physical properties. These physical properties may make the rubber composition particularly suitable for use in or as the outsole for an article of footwear. For example, the rubber composition may exhibit desirable performance with respect to properties related to traction and durability. Specifically, the rubber composition may a level of traction performance while maintaining durability in footwear applications.

With respect to traction performance, the rubber composition may exhibit desirable performance for coefficient of friction, when tested in accordance with SATRA TM144; Young's modulus, when tested in accordance with ASTMD412; elongation, when tested in accordance with ASTM D412; hardness, when tested in accordance with ASTM D2240, and resilience, when tested in accordance with DIN 53512-2000.

For footwear, the coefficient of friction is important as it provides a measure of the force required to slide an object across a surface comprising the rubber composition. Higher values for the coefficient of friction may indicate better traction for an outsole formed from the rubber composition. Young's Modulus measures the flexibility of the rubber composition. More flexibility allows the rubber composition to conform around and within objects. These properties are valuable for a rubber outsole formed from the rubber composition considering the variety of surfaces at which an outsole is contacted, ranging from pavement to terrain and beyond. The value of these properties is even more pronounced in athletic and/or recreational footwear where the outsole may be contacted with irregular, non-uniform, or jagged object such as rocks and crevices. The outsole is able to grab with more surface contact.

Elongation measures how much the rubber composition may be stretched before breaking. Desirable elongation values ensure that the rubber composition as an outsole has the ability to conform to objects or irregular surfaces or a wearer's foot in stride. Hardness measures surface tension of the rubber composition which enables the outsole to conform to surfaces and flow into crevices. Resiliency may refer to a measure of energy absorption. Greater values for energy absorption of the rubber composition ensures distribution of striking force (as during walking) into the surface of the outsole instead of back into a wearer's leg. Lower resiliency values correspond to more energy absorbed by the footwear component formed from the rubber composition.

With respect to durability, the rubber composition may exhibit desirable performance for DIN abrasion, when tested in accordance with DIN 53616; for Die C, when tested in accordance with ASTM D624, for Ross Flex, when tested in accordance with ASTM D1052; and for tensile strength, when tested in accordance with ASTM D412.

For footwear, DIN abrasion DIN Abrasion provides a measure of the amount of material that is abraded off the compound. Values for DIN abrasion of the rubber composition are indicative of wear of an outsole formed from the rubber composition. Die C is a measure of the tear strength of the rubber composition, especially as may relates to outsole lugs. Outsole lugs are design attributes of a given outsole; they are deep indentations in the outsole configured for stability and traction. Ross Flex provides a measure of crack propagation in the rubber composition over a period of flexing and corresponds to outsole wear over time.

The foregoing properties are particularly desirable for their relevance to footwear performance, as opposed to, for example, tire performance. Tire performance, which may be related tangentially to outsole performance considering the similarity among tire and outsole components, focuses on different standards. Tire performance standards inform whether a given composition is optimal for use as tire rubber. As tires and footwear are used in different environments, the tire industry has its own indicators for evaluating traction and durability which may not correspond to those related to footwear. Tires may be used in a broad range of temperatures, such as 80° C. to 200° C., while footwear' temperature range is much smaller. Tires are used predominantly at paved surfaces and are predominantly evaluated for performance thereupon, while footwear may be used across a variety of changing surfaces as a wearer moves. These differences inform the different performance indicators between footwear and tires. As one example, tire standards may rely on DMA (Dynamic Mechanical Analysis) to determine wet traction, dry traction and winter traction (per Akron Rubber Development Lab).

It is also noted that the differences between tire and footwear performance and environments also inform the selection of components of a rubber composition prepared therefrom. As provided above, tires may be employed in a broader temperature range which informs the selection of plasticizer or plasticizing oil. Tire rubber compositions may comprise aromatic plasticizing oils, while footwear outsole rubber compositions may benefit from naphthenic or paraffinic plasticizers. In further examples, rubber compositions for tires require a specific curing or vulcanization process. In some examples, a sulfur containing curing component is not desirable for tire preparation while it is in the construction or preparation of a component of a footwear article, such as an outsole.

The rubber composition may exhibit a wet coefficient of friction of from about 0.4 to about 0.65 when tested in accordance with SATRA TM144, a dry coefficient of friction of from about 0.75 to about 0.90 when tested in accordance with SATRA TM144, a hardness of from about 55 to about 70 when tested in accordance with ASTM D2240, and a DIN abrasion of about 140 to 300 when tested in accordance with DIN 53616.

The type of footwear may also vary the performance properties observed using the rubber composition. For example, for footwear configured for trail use such as for running and hiking, the rubber composition may provide components of an article of footwear that exhibit: a wet coefficient of friction of from about 0.56 to about 0.62 when tested in accordance with SATRA TM144; a dry coefficient of friction of about 0.78 to about 0.88 when tested in accordance with SATRA TM144; an elongation of about 400% to about 600% when tested in accordance with ASTM D412, a Young's Modulus of about 11 kg/cm$^3$ to about 15 kg/cm$^3$ when tested in accordance with ASTM D412; a Shore A hardness of about 60 to about 70 when tested in accordance with ASTM D2240; a resilience of about 13 to about 17 when tested in accordance with DIN 53512 (2000); and a DIN Abrasion of about 200 to about 300 when tested in accordance with DIN 53616.

For footwear configured in relation to skateboards or skateboarding, the rubber composition may provide components of an article of footwear exhibiting: a wet coefficient of friction of from about 0.4 to about 0.55 when tested in accordance with SATRA TM144; a dry coefficient of friction of about 0.78 to about 0.88 when tested in accordance with SATRA TM144; an elongation of about 500% to about 650% when tested in accordance with ASTM D412, a Young's Modulus of about 18 kg/cm$^3$ to about 22 kg/cm$^3$ when tested in accordance with ASTM D412; a Shore A hardness of about 55 to about 65 when tested in accordance with ASTM D2240; a resilience of about 25 to about 45 when tested in accordance with DIN 53512 (2000); and a DIN Abrasion of about 140 to about 200 when tested in accordance with DIN 53616. In some examples, the rubber composition may exhibit a Die C Tear strength greater than the Die C Tear strength of a substantially similar composition in the absence of the tackifying resin when tested in accordance with ASTM D624.

In various aspects, the rubber composition m a percent elongation greater than the percent elongation of a substantially similar composition in the absence of the bromobutyl rubber.

Various combinations of elements of this disclosure are encompassed by this disclosure, e.g., combinations of elements from dependent claims that depend upon the same independent claim.

Aspects of the Disclosure

In various aspects, the present disclosure pertains to and includes at least the following aspects.

Aspect 1: A rubber composition for footwear, the rubber composition comprising: from about 3 phr to 100 phr of a first rubber component; from about 1 phr to about 10 phr of a tackifying resin; From about 10 phr to about 60 phr of a reinforcing filler component; from about 1 phr to about 10 phr of a plasticizer component, from about 0.1 phr to about 5 phr of a curing component, wherein the rubber composition has a wet coefficient of friction of from about 0.4 to about 0.65 when tested in accordance with SATRA TM144; wherein the rubber composition has a dry coefficient of friction of from about 0.75 to about 0.90 when tested in accordance with SATRA TM144; wherein the rubber composition has a hardness of from about 55 to about 70 when tested in accordance with ASTM D2240 and wherein the rubber composition has a DIN abrasion of about 140 to 300 when tested in accordance with DIN 53616.

Aspect 2: A rubber composition for footwear, the rubber composition comprising: from about 3 phr to 100 phr of a first rubber component; from about 10 phr to about 100 phr of a second rubber component; from about 1 phr to about 10 phr of a tackifying resin; From about 10 phr to about 60 phr of a reinforcing filler component; from about 1 phr to about 10 phr of a plasticizer component, from about 0.1 phr to about 5 phr of a curing component, wherein the rubber composition has a wet coefficient of friction of from about 0.4 to about 0.65 when tested in accordance with SATRA TM144; wherein the rubber composition has a dry coefficient of friction of from about 0.75 to about 0.90 when tested in accordance with SATRA TM144; wherein the rubber composition has a hardness of from about 55 to about 70 when tested in accordance with ASTM D2240 and wherein the rubber composition has a DIN abrasion of about 140 to 300 when tested in accordance with DIN 53616.

Aspect 3: The rubber composition of any one of aspects 1-2, wherein the curing component comprises free sulfur or a sulfur donor.

Aspect 4: The rubber composition of any one of aspects 1-3, wherein the curing component comprises curing agents having an active chemical concentration greater than 75%.

Aspect 5: The rubber composition of any one of aspects 1-3, wherein the curing component comprises curing agents having an active chemical concentration greater than or equal to 80%.

Aspect 6: The rubber composition of any one of aspects 1-5, wherein the curing component further comprises a curing aid.

Aspect 7: The rubber composition of aspect 6, wherein the curing aid comprises a polyethylene glycol.

Aspect 8: The rubber composition of aspects 6-7, wherein the curing aid is present in an amount from about 1 phr to about 8 phr.

Aspect 9: The rubber composition of any one of aspects 6-7, wherein the curing aid is present in an amount from about 1 phr to about 5 phr.

Aspect 10: The rubber composition of any one of aspects 1-9, wherein the first rubber component comprises a halobutyl rubber.

Aspect 11: The rubber composition of any one of aspects 1-9, wherein the first rubber component comprises a bromobutyl rubber.

Aspect 12: The rubber composition of any one of aspects 1-11, wherein the first rubber component is present in an amount of from about 20 phr to 70 phr.

Aspect 13: The rubber composition of any one of aspects 1-11, wherein the first rubber component is present in an amount of from about 20 phr to 50 phr.

Aspect 14: The rubber composition of any one of aspects 1-11, wherein the first rubber component is present in an amount of from about 30 phr to 60 phr.

Aspect 15: The rubber composition of aspect 2-14, wherein the second rubber component comprises a natural rubber.

Aspect 16: The rubber composition of any one of aspects 2-15, wherein the second rubber component is present in an amount of from about 20 phr to 70 phr.

Aspect 17: The rubber composition of any one of aspects 2-15, wherein the second rubber component is present in an amount of from about 30 phr to 60 phr.

Aspect 18: The rubber composition of any one of aspects 2-15, wherein the second rubber component is present in an amount of from about 20 phr to 50 phr.

Aspect 19: The rubber composition of any one of aspects 1-18, wherein the first rubber component is free of or substantially free of a styrene butadiene rubber.

Aspect 20: The rubber composition of any one of aspects 2-19, wherein the second rubber component is free of or substantially free of a styrene butadiene rubber.

Aspect 21: The rubber composition of any one of aspects 1-20, wherein the tackifying resin comprises a polyterpene.

Aspect 21A: The rubber composition of any one of aspects 1-20, wherein the tackifying resin comprises a non-polar terpene resin.

Aspect 22: The rubber composition of any one of aspects 1-20, wherein the tackifying resin comprises an alpha-pinene derived polyterpene polymer.

Aspect 23: The rubber composition of any one of aspects 1-20, wherein the tackifying resin comprises a beta-pinene derived polyterpene polymer.

Aspect 24: The rubber composition of any one of aspects 1-23, wherein the tackifying resin is present in an amount from about 3 phr to about 10 phr.

Aspect 25: The rubber composition of any one of aspects 1-23, wherein the tackifying resin is present in an amount from about 3 phr to about 6 phr.

Aspect 26: The rubber composition of any one of aspects 1-23, wherein the tackifying resin is present in an amount about 4 phr.

Aspect 27: The rubber composition of aspect 1, wherein the reinforcing filler component comprises silica.

Aspect 28: The rubber composition of any one of aspects 1-27, wherein the reinforcing filler component further comprises a silane coupling agent.

Aspect 29: The rubber composition of any one of aspects 1-29, wherein the plasticizer component comprises a paraffinic oil.

Aspect 30: The rubber composition of any one of aspects 1-29, wherein the plasticizing component comprises a naphthenic mineral oil.

Aspect 31: The rubber composition of any one of aspects 1-30, wherein the plasticizing component is present in an amount from about 1 phr to about 15 phr.

Aspect 32: The rubber composition of any one of aspects 1-30, wherein the plasticizing component is present in an amount from about 1 phr to about 10 phr.

Aspect 33: The rubber composition of any one of aspects 1-32, wherein the reinforcing filler component is free of or substantially free of carbon black.

Aspect 34: A rubber composition for footwear, the rubber composition comprising: from about 10 phr to 90 phr of a first rubber component; from about 10 phr to about 90 phr of a second rubber component; from about 3 phr to about 6 phr of a polyterpene resin; from about 0.1 phr to about 5 phr of a sulfur curing component; from about 10 phr to about 60 phr of a silica; and from about 1 phr to about 10 phr of a plasticizing agent; wherein the rubber composition has a wet coefficient of friction of from about 0.4 to about 0.65 when tested in accordance with SATRA TM144; wherein the rubber composition has a dry coefficient of friction of from about 0.75 to about 0.90 when tested in accordance with SATRA TM144; wherein the rubber composition has a hardness of from about 55 to about 70 when tested in accordance with ASTM D2240 and wherein the rubber composition has a DIN abrasion of about 140 to 300 when tested in accordance with DIN 53616.

Aspect 35: The rubber composition of aspect 34, wherein the first rubber component is present in an amount of from about 20 phr to 70 phr.

Aspect 36: The rubber composition of aspect 34, wherein the first rubber component is present in an amount of from about 20 phr to 50 phr.

Aspect 37: The rubber composition of aspect 34, wherein the first rubber component is present in an amount of from about 30 phr to 60 phr.

Aspect 38: The rubber composition of any one of aspects 34-37, wherein the second rubber component is present in an amount of from about 20 phr to 70 phr.

Aspect 39: The rubber composition of any one of aspects 34-37, wherein the second rubber component is present in an amount of from about 30 phr to 60 phr.

Aspect 40: The rubber composition of any one of aspects 34-37, wherein the second rubber component is present in an amount of from about 20 phr to 50 phr.

Aspect 41: The rubber composition of any one of aspects 34-40, wherein the curing component comprises curing agents having an active chemical concentration greater than 75%.

Aspect 42: The rubber composition of any one of aspects 34-40, wherein the curing component comprises curing agents having an active chemical concentration greater than or equal to 80%.

Aspect 43: The rubber composition of any one of aspects 34-42, wherein the curing component further comprises a curing aid.

Aspect 44: The rubber composition of aspect 43, wherein the curing aid comprises a polyethylene glycol.

Aspect 45: The rubber composition of any one of aspects 343-44, wherein the curing aid is present in an amount from about 1 phr to about 8 phr.

Aspect 46: The rubber composition of any one of aspects 43-44, wherein the curing aid is present in an amount from about 1 phr to about 5 phr.

Aspect 47: The rubber composition of any one of aspects 34-46, wherein the polyterpene resin comprises a beta-pinene derived polyterpene.

Aspect 48: The rubber composition of any one of aspects 34-47, wherein the polyterpene resin is present in an amount from about 3 phr to about 10 phr.

Aspect 49: The rubber composition of any one of aspects 34-47, wherein the polyterpene resin is present in an amount from about 3 phr to about 6 phr.

Aspect 50: The rubber composition of any one of aspects 34-47, wherein the polyterpene resin is present in an amount about 4 phr.

Aspect 51: The rubber composition of any one of aspects 34-50, further comprising a silane coupling agent.

Aspect 52: A method of forming a rubber composition for footwear, the method comprising: combining: from about 10 phr to 90 phr of a first rubber component; from about 10 phr to about 90 phr of a second rubber component; from about 3 phr to about 6 phr of a polyterpene resin; from about 10 phr to about 60 phr of a silica; from about 0.1 phr to about 15 phr of a curing component; and from about 1 phr to about 10 phr of a plasticizing agent; to form a first rubber mixture; combining the first rubber mixture with a curing agent to provide a second rubber mixture; and subjecting the second rubber mixture to a curing process to provide the rubber composition.

Aspect 53: A rubber composition comprising: from about 10 phr to 100 phr of a natural rubber; from about 10 phr to about 100 phr of a bromobutyl rubber; from about 1 phr to about 10 phr of a tackifying resin; From about 10 phr to about 60 phr of a reinforcing filler component; from about 1 phr to about 10 phr of a plasticizer component, from about 0.1 phr to about 5 phr of a curing component, wherein the rubber composition has a wet coefficient of friction of from about 0.4 to about 0.65 when tested in accordance with SATRA TM144; wherein the rubber composition has a dry coefficient of friction of from about 0.75 to about 0.90 when tested in accordance with SATRA TM144; wherein the rubber composition has a hardness of from about 55 to about 70 when tested in accordance with ASTM D2240 and wherein the rubber composition has a DIN abrasion of about 140 to 300 when tested in accordance with DIN 53616.

Definitions

It is also to be understood that the terminology used herein is for the purpose of describing particular aspects only and is not intended to be limiting. As used in the specification and in the claims, the term "comprising" can include the embodiments "consisting of" and "consisting essentially of" Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a chemical additive" includes mixtures of two or more chemical additives.

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optional curing treatment" means that the curing treatment may or may not be applied and that the description includes fabrics to which the curing treatment has been applied and also fabrics that have not been subjected to a curing treatment.

As used herein, the term "effective amount" refers to an amount that is sufficient to achieve the desired modification of a physical property of the composition or material. For example, an "effective amount" of a curing additive refers to an amount that is sufficient to achieve the desired improvement in the property modulated by the formulation component, e.g., achieving the desired level of curing. The specific level in terms of wt % in a composition required as an effective amount will depend upon a variety of factors including, but not limited to, the fabric and chemical additive selected and the end use of the fabric or garment.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

The term "footwear" or an "article of footwear" may refer to a type of apparel worn on the feet. Footwear may include, for example, shoes, boots, sandals, etc. Athletic and recreational footwear described herein may refer to shoes such as sneakers, for example, worn in certain activities. As described herein components of an article of footwear may refer to different parts of a shoe. These components may include upper, heel counter, midsole, toe-cap, midsole, and outsole, for example. The rubber composition may be suited in specific examples for construction of the foxing, midsole, and/or outsole.

The term "phr" is used to designate parts by weight of a component per 100 parts of (rubber) elastomer unless otherwise indicated.

The terms "elastomer" and "rubber" are used interchangeably unless otherwise indicated.

The terms "cure" and "vulcanize" are used interchangeably unless otherwise indicated.

The terms "free of" or "substantially free of" a given component as used herein may indicate that a component, such as a styrene butadiene rubber or a carbon black, has not been added to the components. Or, "substantially free of" may refer to less a threshold amount present in the rubber composition. For example, substantially free of may refer to less 0.1 phr, less than 0.05 phr, or less than 0.01 phr for example. Substantially free can refer to an amount, if present at all, below a detectable level.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Example 1

A rubber composition was prepared according to the methods disclosed herein. A natural rubber and a bromobutyl rubber were premixed and allowed to rest. Non-polymer components were combined. A second mixture was prepared from paraffinic oil, polyterpene resin, zinc oxide and dibenzothiazole disulfide (DM). Polyethylene glycol, 2-mercaptobenzothiazole (M), and a silane coupling agent were combined. The pre-mixed natural rubber and bromobutyl rubber were added and mixed. A half portion of silica was added. The second half of the silica was added to the paraffinic oil, polyterpene resin, ZnO, dibenzothiazole disulfide DM and the resultant mixture was added to the combination of polyethylene glycol, 2-mercaptobenzothiazole and silane coupling agent and mixed.

The resulting mixture was open milled until homogenized. The milled rubber was formed into sheets and cooled. The sheets were divided into portions and stored before the sulfur curing agents were introduced. The rubber was then open milled and the tetrabenzylthiuram disulfide (TBzTD) and free sulfur were added to form the vulcanized rubber.

Table 1 comprises the components and their respective amounts for forming the rubber composition.

TABLE 1

Formulation for disclosed rubber composition.

| Component | Grade | E1 (PHR) |
|---|---|---|
| Polymer System | | |
| Bromo Butyl Rubber (BIIR) | Xbutyl ™ BB2030 | 60 |
| Natural Rubber (NR) | SMR L | 40 |
| Curing System | | |
| DM | 80 | 1.46 |
| M | 80 | 0.26 |
| TBzTD | 75 | 0.70 |
| Sulfur | 80 | 2.70 |
| Zinc Oxide | Opaque | 5 |
| Filler System/Additives | | |
| Silica | Zeosil ™ 175 | 45 |
| Silane Coupling Agent | Si69 | 1.50 |
| Terpene Resin | Piccolyte ™ S125 | 4 |

TABLE 1-continued

Formulation for disclosed rubber composition.

| Component | Grade | E1 (PHR) |
|---|---|---|
| Naphthenic Oil | Mineral | 5 |
| PEG | 4000 | 4 |
| Stearic Acid | — | 1 |
| Black Pigment | Intex ™ | 1 |

Formulations for comparative samples (CS1 and CS2) represent conventional traction rubber compositions (for a conventional rubber footwear outsole) and are presented in Table 2.

TABLE 2

Formulation of comparative samples CS1 and CS2

| Component | CS1 | CS2 |
|---|---|---|
| Butyl Rubber (IIR) | 55 | 55 |
| Natural Rubber (NR) | 15 | 15 |
| Butadiene Rubber (BR) | 30 | 30 |
| Zinc dibenzyldithiocarbamte (ZBEC) | 1 | 0.5 |
| Zinc dimethyldithiocarbamate (ZDMC), zinc dibutyldithiocarbamate (ZDBC), Zinc diethyldithiocarbamate ZDEC | — | — |
| Sulfur | 1.4 | 2 |
| Zinc Stearate | 3 | 3 |
| Zinc Oxide | — | — |
| MBTS | 1.5 | 1.5 |
| Carbon Black | 1 | 2.5 |
| Silica | 38.5 | 48 |
| Silane Coupling Agent | 1 | 1 |
| Paraffinic Oil | 2.5 | 5 |
| Dioctyl adipate (DOA) plasticizer | 2 | — |
| Hydrocarbon Wax | 1 | 0.5 |

Results for certain physical properties for the comparative samples CS1, CS2 and an inventive sample are presented in Table 3. The inventive sample E1 was prepared in six batches (E1a-E1f). Each inventive sample was evaluated for the properties presented in Table 3 as presented in FIG. 1.

Values for Hardness were obtained according to ASTM D2240 and are presented as Shore A hardness; for DIN Abrasion according to DIN 53616 in units of cubic millimeters ($mm^3$) lost; for coefficient of friction according to SATRA TM144 dry and wet, for Ross flex according to ASTM D1052 at 15° C. and room temperature (RT); for tensile strength according to ASTM D412 in units of kilograms per cubic centimeters ($kg/cm^3$); for tensile elongation according to ASTM D412; for Young's modulus according to TM-R-047 in $kg/cm^3$; for Trouser tear according to ASTM 624 in units of kilograms per centimeter (kg/cm), for Die C tear according to ASTM D624 in kg/cm; and for resiliency according to RTH 458. Specific gravity SG is presented in grams per cubic centimeter (g/cc). Stitch tear is presented in kilogram·force per centimeter (kgf/cm);

As shown the disclosed rubber compositions exhibit values for DIN Abrasion that are generally lower than for CS1 and CS2. Furthermore, the disclosed rubber compositions exhibit Die C Tear values that are higher than those for CS1 and CS2. Specifically, the disclosed compositions exhibited Die C Tear strength values about twice as high as those for CS1 and CS2.

Example 2

A series of rubber composition samples were prepared having 100 phr of natural rubber. Example 2 isolates the impact of the polyterpene resin with natural rubber. The beta-pinene derived polyterpene interacts with chains of the natural rubber. The samples were varied according to the presence, amount, and type of polyterpene rubber. Formulations are presented in Table 4.

TABLE 4

Formulation of disclosed inventive sample E2.

| COMPONENT | Grade | E2 (PHR) | CS3 |
|---|---|---|---|
| Polymer system | | | |
| Natural Rubber (NR) | SMR L | 100.00 | 100.00 |
| Curing System | | | |
| Dibenzothiazole disulfide (MBTS or DM) | 80% Active | 1.46 | 1.46 |
| 2-Mercaptobenzothiazole (MBT or M) | 80% Active | 0.33 | 0.33 |
| Tetrabenzylthiuram disulfide (TBzTD) | 80% Active | 0.13 | 0.13 |
| Sulfur (S) | 80% Active | 2.70 | 2.70 |
| Filler System/Additives | | | |
| Silicon Dioxide (Silica) | Fengsil ™ 140P | 50.00 | 50.00 |
| Silane Coupling Agent | Si69 | 1.50 | 1.50 |
| Polyterpene Resin | Piccolyte S125 | 3.00 | 0 |
| Butylated hydroxytoluene (BHT) | | 1.00 | 1.00 |
| Natural Paraffinic Oil | | 1.00 | 1.00 |
| Polyethylene Glycol (PEG) | 4000 | 4.00 | 4.00 |
| Stearic Acid | | 1.00 | 1.00 |
| Zinc Oxide | | 5.00 | 5.00 |

The resulting samples were tested for various physical properties and the results are presented in Table 5 in FIG. 2. Comparative sample CS3 is the same as E2 but for the absence of polyterpene. The inventive sample E2 was prepared in six batches (E2a-E2c). Each inventive sample was evaluated for the properties presented in Table 3.

From these results, it was apparent that polyterpene affected both durability and traction properties. With respect to traction, elongation, Modulus, and resilience appeared to vary depending on the presence and type of polyterpene. Elongation appeared to increase based on the addition of polyterpene while the observed values for Young's modulus decreased. The decreased Young's modulus corresponds to an increase in flexibility. Values for resiliency also decreased with the addition of the polyterpene. For durability, the introduction of the polyterpenes resulted in a higher Die C Tear, indicating a higher tear strength for the rubber composition.

Example 3

A series of rubber composition samples were prepared having 100 phr of natural rubber. The samples were varied according to the presence, amount, and type of polyterpene rubber. A comparative formulation having a single natural rubber component (CS4) and an inventive sample having a first rubber component (natural rubber) and a second rubber component (bromobutyl rubber) are presented in Table 5.

TABLE 5

Formulation of comparative sample CS4 and inventive sample E3.

| COMPONENT | Grade | CS4 | E3 |
|---|---|---|---|
| Natural Rubber | SMR 3L | 100.00 | 5.00 |
| BIIR | Exxon 2244 | 0 | 95.00 |
| Dibenzothiazole disulfide (MBTS or DM) | 80% Active | 1.46 | 1.46 |
| Accelerator D | | 0.33 | 0.33 |
| Tetrabenzylthiuram disulfide (TBzTD) | 80% Active | 0.16 | 0.16 |
| Sulfur (S) | 80% Active | 1.40 | 2.10 |
| Silicon Dioxide (Silica) | Fengsil 140 | 40.00 | 43.00 |
| Silane Coupling Agent | Si69 | 0.50 | 0.50 |
| Polyterpene Resin | Piccolyte S125 | 3.00 | 2.00 |
| Butylated hydroxytoluene (BHT) | | 1.00 | 1.00 |
| Natrual Paraffinic | | 1.00 | 1.00 |
| PEG | 4000 | 2.50 | 2.50 |
| Stearic Acid | | 1.00 | 1.00 |
| Zinc Oxide | | 5.00 | 5.00 |

Samples were tested for various physical properties and the results are presented in Table 6 in FIG. 3. Sample CS4 is similar to E3 but for the amount of polyterpene resin and the absence of bromobutyl rubber as a second rubber component.

From these results, it was apparent that polyterpene affected both durability and traction properties. DIN Abrasion, elongation, modulus, and Die C tear strength appeared to vary significantly based on the presence of bromobutyl rubber as a rubber component (E3) compared to only natural rubber (CS4).

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

All publications mentioned herein are incorporated herein by reference to disclose and describe the methods and/or materials in connection with which the publications are cited.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the disclosure should be determined with reference to the appended claims, along with the full scope of equivalents to which such claims are entitled.

That which is claimed is:

1. A rubber composition for footwear, the rubber composition comprising:
   from about 3 phr to 95 phr of a halobutyl rubber component;
   from about 5 phr to about 97 phr of a natural rubber component;
   from about 2 phr to about 6 phr of a tackifying resin comprising a polyterpene resin,
     wherein the polyterpene resin comprises an alpha-pinene or beta-pinene derived polyterpene polymer;
   from about 10 phr to about 60 phr of a reinforcing filler component;
   from about 1 phr to about 10 phr of a plasticizer component,
   from about 0.1 phr to about 5 phr of a curing component,
   wherein the rubber composition has a wet coefficient of friction of from about 0.4 to about 0.65 when tested in accordance with SATRA TM144,
   wherein the rubber composition has a dry coefficient of friction of from about 0.76 to about 0.90 when tested in accordance with SATRA TM144,
   wherein the rubber composition has a DIN abrasion of greater than 140 when tested in accordance with DIN 53616, and
   wherein the rubber composition exhibits Die C Tear strength greater than the Die C Tear strength of a substantially similar composition in the absence of the tackifying resin when tested in accordance with ASTM D624.

2. The rubber composition of claim 1, wherein the halobutyl rubber component comprises a bromobutyl rubber.

3. The rubber composition of claim 1, wherein the halobutyl rubber component is free of or substantially free of a styrene butadiene rubber.

4. The rubber composition of claim 1, wherein the natural rubber component is free of or substantially free of a styrene butadiene rubber.

5. The rubber composition of claim 1, wherein the rubber composition is free of or substantially free of carbon black.

6. The rubber composition of claim 1, wherein the reinforcing filler component comprises silica.

7. The rubber composition of claim 1, wherein the reinforcing filler component further comprises a silane coupling agent.

8. The rubber composition of claim 1, wherein the plasticizer component comprises a paraffinic oil.

9. The rubber composition of claim 1, wherein the plasticizing component comprises a naphthenic mineral oil.

10. The rubber composition of claim 1, wherein the curing component comprises free sulfur or a sulfur donor.

11. The rubber composition of claim 1, wherein the curing component further comprises a curing aid.

12. The rubber composition of claim 2, wherein the rubber composition exhibits a percent elongation greater than the percent elongation of a substantially similar composition in the absence of the bromobutyl rubber.

13. A method of forming a rubber composition for footwear, the method comprising: combining:
   from about 3 phr to 90 phr of a first rubber component;
   from about 10 phr to about 90 phr of a second rubber component;
   from about 3 phr to about 6 phr of a polyterpene resin;
   from about 10 phr to about 60 phr of a silica;
   from about 0.1 phr to about 15 phr of a curing component; and
   from about 1 phr to about 10 phr of a plasticizing agent;
   to form a first rubber mixture;
   combining the first rubber mixture with a curing agent to provide a second rubber mixture; and
   subjecting the second rubber mixture to a curing process to provide the rubber composition.

14. The rubber composition of claim 1, wherein the rubber composition comprises:
   from about 2 phr to about 3 phr of a tackifying resin comprising a polyterpene resin.

* * * * *